United States Patent [19]

Cunningham

[11] 4,328,856
[45] May 11, 1982

[54] HEAT RECOVERY WHEEL

[75] Inventor: George M. Cunningham, Horseheads, N.Y.

[73] Assignee: Corning Glass Works, Corning, N.Y.

[21] Appl. No.: 205,778

[22] Filed: Nov. 10, 1980

[51] Int. Cl.³ ............................................. F28D 19/00
[52] U.S. Cl. ..................................... 165/8; 403/259; 403/356; 403/359; 403/365
[58] Field of Search ...................... 165/8, 10; 403/259, 403/359, 355, 356, 365

[56] References Cited

U.S. PATENT DOCUMENTS

| | | | |
|---|---|---|---|
| 2,415,033 | 1/1947 | Nygren | 403/355 X |
| 3,022,073 | 2/1962 | Miller | 403/355 X |
| 3,612,163 | 10/1971 | Powell | 165/8 |
| 4,144,929 | 3/1979 | French et al. | 165/8 |

FOREIGN PATENT DOCUMENTS

| | | | |
|---|---|---|---|
| 2407442 | 8/1975 | Fed. Rep. of Germany | 165/8 |
| 567959 | 12/1923 | France | 403/356 |
| 17888 | of 1906 | United Kingdom | 403/259 |

*Primary Examiner*—Albert W. Davis
*Attorney, Agent, or Firm*—Richard N. Wardell

[57] ABSTRACT

Disclosed is an improved ceramic heat recovery wheel driven on a shaft containing a metal hub which may be driven without slippage between the wheel and the hub. The wheel includes a splined metal shaft which mates with the disk including a plurality of radially extending keys equi-angularly spaced about its circumference. The ceramic disk includes an equal plurality of radially extending keyways which mate with the keys. In one embodiment, the keys are situated on only one side of the bore of the ceramic disk and the keyways do not extend through the bore. On the opposite face of the disk, a retainer plate surrounds the shaft. An axial force is applied to the retainer plate for restraining movement of the wheel in the axial direction.

9 Claims, 2 Drawing Figures

HEAT RECOVERY WHEEL

BACKGROUND OF THE INVENTION

The present invention relates in general to rotatable heat exchangers, sometimes known as heat recovery wheels, and in particular, it relates to a novel mounting structure for such heat recovery wheels. In gas turbines, furnaces, and other combustion chambers, it is desirable to preheat incoming combustion gases with heat extracted from exhaust gases, thereby increasing combustion efficiency. Rotary heat exchangers or heat recovery wheels are particularly desirable for this purpose. Heat recovery wheels are generally mounted for rotation about a central axis. The wheel first rotates through the exhaust gas stream. The wheel has apertures extending therethrough in the axial direction and as gases flow through the apertures, heat is extracted from the exhaust gas stream and absorbed by the wheel. As the wheel further rotates through the incoming gas stream, this heat is given up by the wheel to the incoming gas.

While heat recovery wheels may be made from metal, ceramic materials are preferred because ceramic materials have a low coefficient of thermal expansion and a high resistance to oxidation and corrosion. However, even though ceramics are chosen for the body of such wheels, metals are still employed for the hub driver therefor. Since the coefficient of expansion of the metal hub differs from the coefficient of expansion of the ceramic, it is generally necessary to securely mount the wheel to the hub while permitting differential thermal expansion of the hub in the axial and radial directions with respect to the wheel.

The mounting of such metal hubs to ceramic heat recovery wheels has posed somewhat of a problem to the prior art. Since rigid connections cannot be made between the metal hub and the ceramic rotary heat recovery wheel, slippage may at times occur between the ceramic wheel and the metal hub. Such slippage is detrimental since the ceramic disk may thus be subjected to unwanted temperature variations across its diameter. Such temperature variations may cause cracking and breakage of the ceramic disk.

It would be desirable to provide an improved rotary heat recovery wheel having a mounting device therefor which prevents slippage between the ceramic disk and metal hub thereof.

SUMMARY OF THE INVENTION

The foregoing objective is achieved by the provision of a heat recovery wheel comprising a round ceramic disk having a first face and a second face parallel thereto. The wheel is driven by a splined shaft which mates with the disk for driving the same without slippage. Moreover, in accordance with the present invention, the splined shaft includes a plurality of radially extending keys which mate with an equal plurality of radially extending key ways formed in the first face of the disk. The radial dimension of the key way exceeds the radial dimension of the keys thereby permitting differential expansion of the metal hub with respect to the ceramic disk in the radial direction without breakage. Moreover, the keys and key ways prevent the splined shaft and ceramic disk from slipping with respect to one another.

In accordance with an important embodiment of the present invention, the disk further includes a bore extending between the first and second face of the disk. However, the key ways do not extend completely through the bore formed in the first face of the ceramic disk. A retainer plate mounted to the shaft abuts against the second face of the wheel and means are provided for applying an axial force to the retainer plate for maintaining the keys and key ways in abutting relationship thereby fixing the ceramic disk to the shaft by clamping the disk between the keys and the retainer plate. The force applying means includes a spring which permits differential thermal expansion of the metal hub with respect to the ceramic disk to occur in the axial direction. In one embodiment, the retainer plate may also be keyed, the keys thereof mating with key ways formed in the second face in order to further prevent slippage.

BRIEF DESCRIPTION OF THE DRAWINGS

The present invention will be more fully understood by reference to the accompanying drawing in which.

DETAILED DESCRIPTION OF THE PREFERRED EMBODIMENT

Figure 1:
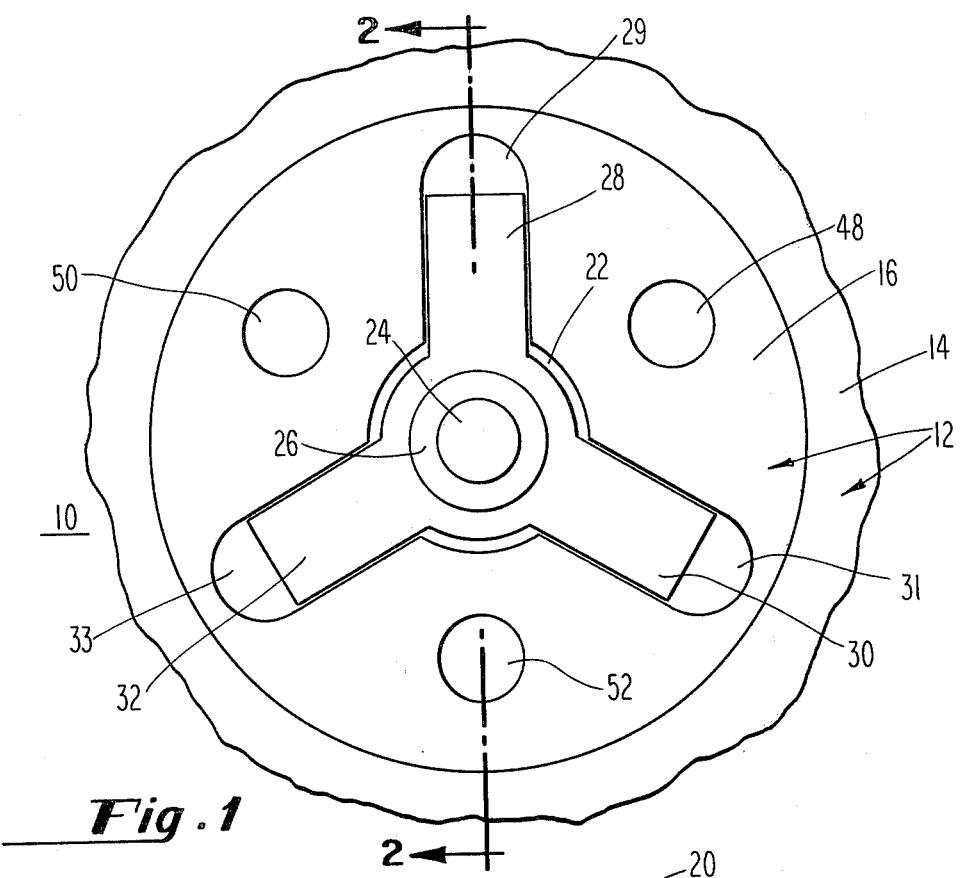
FIG. 1 is a plan view of the central portion of rotatable heat recovery wheel modified in accordance with the present invention.

FIG. 1 shows the central portion of a rotatable heat recovery wheel generally at 10. The wheel 10 includes a round ceramic disk shown generally at 12. The ceramic disk 12 may be formed of cordierite, beta spodumene or beta quartz for example. The ceramic disk 12 contains an apertured portion 14 and a non-apertured portion or ceramic hub 16. The apertured portion 14 contains a plurality of apertures or open cells (not shown) the longitudinal axes of which extend parallel to the axis of the wheel 10. In the preferred embodiment, the apertured portion 14 of the ceramic disk 12 is made according to the teachings of U.S. Pat. No. 3,790,654, usually as segments which are later cemented together.

Figure 2:
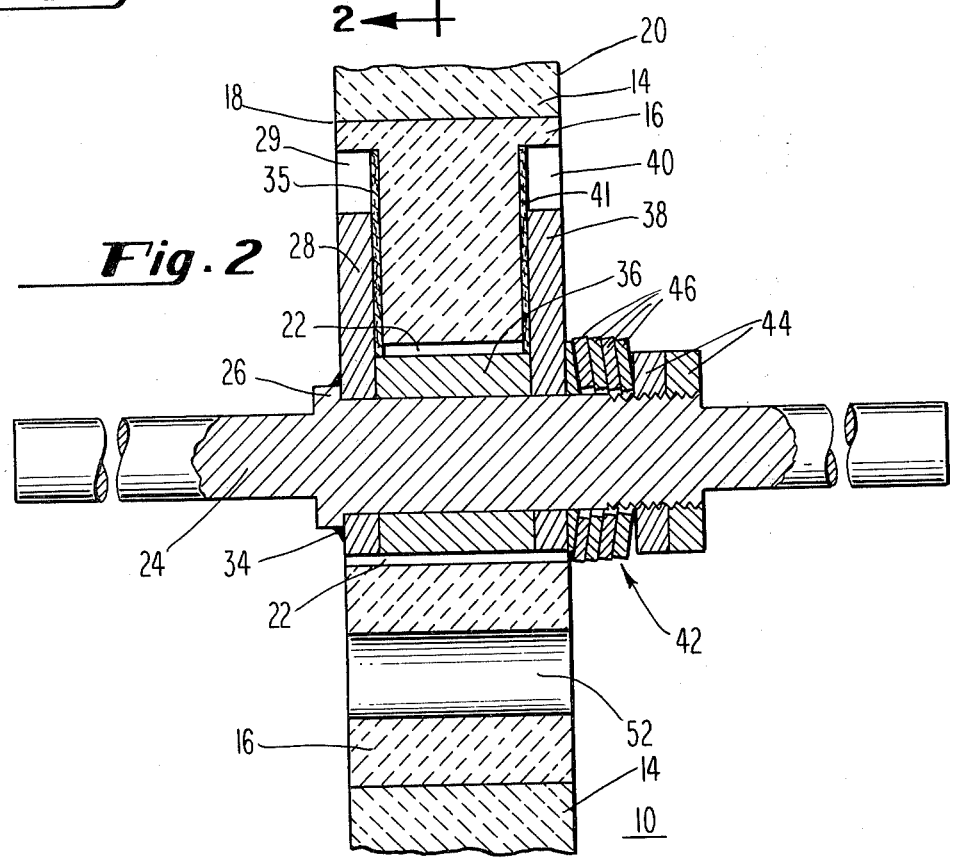
FIG. 2 is a cross-sectional view taken along the lines 2—2 of FIG. 1.

As may best be seen from FIG. 2, the ceramic disk 12 has a first face 18 on the one side thereof and a second parallel face 20 opposite thereto. The ceramic disk 12 includes a central bore 22 therein which extends between the first face 18 and the second face 20. In accordance with an important aspect of the present invention, situated within and passing through the bore 22 is a splined shaft 24 which supports the ceramic disk 12 for a rotational motion with the shaft 24 about its longitudinal axis.

The shaft 24 comprises an annular collar 26. Abutting against the collar 26 and extending radially outwardly from the axis of the shaft 24 are a plurality of keys equiangularly situated aobut the shaft 24. In the embodiment shown in FIGS. 1 and 2, three keys, 28, 30 and 32 are shown spaced 120 degrees apart about the axis of the shaft. While any number of keys may be employed, it is preferred that at least three keys be employed so as to aid in keeping the ceramic disk 12 centered about the axis of the shaft 24. In the embodiment shown in FIG. 1, the keys 28, 30 and 32 are part of a unitary body which, as seen in FIG. 2, is fastened to the shaft 24 at the collar 26 by welding at the joint 34. The keys 28, 30 and 32 of the splined shaft 24 mate with the ceramic disk 12 for rotatably driving the same without slippage. This mating is accomplished by means of a plurality of radially extending key ways 29, 31 and 33 which cooperate with keys 28, 30 and 32, respectively. The key ways 29, 31 and 33 are preferably formed in the first face 18 at the non-apertured portion 16 of the ceramic disk 12 by means of machining. The key ways 29, 31 and 33 extend radially outwardly from the axis of the shaft 24 beyond the radial extremities of the keys 28, 30 and 32 so as to accommodate differential thermal expansion of keys with respect to key ways without cracking the ceramic disk 12. It is preferred, though not required, that thermal insulation 35 be provided within each of the key ways 29, 31 and 33. The insulation is situated between the keys 28, 30 and 32 and the non-apertured portion 16 of the disk 12 as shown.

As seen in FIG. 2, the keys 28, 30 and 32 and key ways 29, 31 and 33 do not extend from the first face 18 to the second face 20 of the disk 12. Instead, the key ways 29, 31 and 33 have a dimension in the axial direction which is less than the axial dimension (width) of the disk 12. A metal spacer 36 is provided which extends through the bore 22. At the second face 20, a retainer plate 38 is provided which surrounds the shaft 24. In the preferred embodiment, the retainer plate 38 has the same configuration as the integral body comprising the keys 28, 30 and 32 and therefore also includes a plurality of radially extending keys equi-angularly spaced about the shaft 24. The keys of the retainer plate 38 mate with key ways such as 40 which are formed in the second face 20 of the disk 12 as shown. Insulation 14 (similar to insulation 35) is positioned between plate 38 and portion 16. In accordance with an important aspect of the present invention, a means 42 is provided for applying an axial force to the retainer plate 38 so as to maintain the keys 28, 30 and 32 in abutting relationship with the key ways 29, 31 and 33 thereby clamping the non-apertured portion 16 of the disk 12 between the keys 28, 30 and 32 and the retainer plate 38. This means 42 for applying the aforementioned axial force includes a pair of lock nuts 44 which threadedly engage the shaft 24 as shown in FIG. 2. Bearing against the lock nuts 44 are a plurality of spring means 46 which preferably comprise Belleville springs thus allowing differential thermal expansion of the shaft 24 with respect to the non-apertured portion 16 of the disk 12 in the axial direction against the bias of the spring means 46 while still providing a suitable axially directed force between the keys 28, 30 and 32 and the retainer plate 38 for securely mounting the disk 12 to the shaft 24. It should be noted that in the preferred embodiment the shaft 24, keys 28, 30 and 32, spacer 36 and nuts 44 are formed of A.S.T.M. 316 stainless steel.

While there should be dimensional allowance for the width of the key ways being greater than the width of the keys at ordinary ambient temperature to accommodate different thermal expansion between the keys and portion 16 during use of the wheel 10, such allowance should be minimized as far as reasonably possible to enhance centering wheel 10.

It should be appreciated that key ways formed in the second face 20 of the disk 12 are also preferably formed by machining as are apertures 48, 50, 52. These apertures extend axially through the non-apertured portion 16 of the disk 12. These apertures are provided for cooling the nonaperatured portion 16 as well as the shaft 24.

Optionally, key ways 29, 31 and 33, key ways or recesses for plate 38 and aperatures 48, 50 and 52 can be provided in solid ceramic portion 16 by initially molding portion 16 with these indented features prior to firing to the finished sintered state.

While a particular embodiment of the present invention has been shown and described, it will be appreciated, that other modifications of the invention, not specifically mentioned, will occur to those skilled in the art and are intended to be included within the scope of the appended claims.

What is claimed is:

1. A rotatable heat recovery wheel comprising:
   a round ceramic disk having a first face and a second face parallel thereto;
   a splined metal shaft mating with said disk for rotatably driving the same without slippage between said shaft and said disk;
   said splined shaft including a plurality of radially extending keys equi-angularly spaced thereabout; and
   said disk including an equal plurality of radially extending key ways in and open at at least one face thereof, but not extending to the other face thereof, and equi-angularly spaced thereabout for mating with said keys.

2. The heat recovery wheel of claim 1 wherein:
   said key ways extend radially outwardly beyond said keys.

3. The heat recovery wheel of claim 2 wherein:
   said plurality is greater than or equal to three.

4. The heat recovery wheel of claim 3 wherein:
   said disk includes a bore communicating between said first and said second faces, said shaft being situated therein.

5. The heat recovery wheel of claim 4 wherein:
   said keys are situated on only one side of said bore and wherein said key ways are formed in said first face without extending through said bore.

6. The heat recovery wheel of claim 5 further comprising:
   a retainer plate surrounding said shaft at said second face; and
   a means for applying an axial force to said retainer plate whereby said keys and key ways are maintained in an abutting relationship and said disk and shaft are restrained from movement with respect to each other.

7. The heat recovery wheel of claim 6 wherein:
   said retainer plate contains a plurality of radially extending keys equi-angularly spaced about said shaft.

8. The heat recovery wheel of claim 7 wherein:
   said disk further includes an equal plurality of radially extending key ways formed in said second face without extending through said bore for mating with the keys of said retainer plate.

9. The wheel of claim 1 wherein thermal insulation is situated between said keys and said disk.

* * * * *